United States Patent [19]
Corbett et al.

[11] 3,938,050
[45] Feb. 10, 1976

[54] NON-LINEAR CORRECTION OF WAVEFORMS
[75] Inventors: John McCreath Corbett, Harrow; Josef Maria Linke, Watford, both of England
[73] Assignee: The Post Office, London, England
[22] Filed: Sept. 9, 1974
[21] Appl. No.: 504,157

[30] Foreign Application Priority Data
Sept. 25, 1973 United Kingdom............... 44888/73

[52] U.S. Cl. ................ 328/163; 328/127; 328/164
[51] Int. Cl.².. H03B 1/04; H04B 1/10; H04B 15/00
[58] Field of Search ............................ 328/162–164, 328/127, 144, 187; 307/268; 325/436, 473, 477

[56] References Cited
UNITED STATES PATENTS

| | | | |
|---|---|---|---|
| 2,446,613 | 8/1948 | Shapiro | 328/163 |
| 3,195,055 | 7/1965 | Dean | 328/162 |
| 3,252,098 | 5/1966 | Schlaepfer | 328/127 X |
| 3,584,235 | 6/1971 | Fukui et al. | 328/163 X |

*Primary Examiner*—John Zazworsky
*Attorney, Agent, or Firm*—Hall & Houghton

[57] ABSTRACT

This disclosure relates to the non-linear correction of electrical signals in waveform transmission and recording systems such as television systems, visual telephone systems, facsimile transmission systems and sound recording systems.

14 Claims, 32 Drawing Figures

FIG. 8a — ENERGY DENSITY SPECTRUM OF FIG. 2 WAVEFORM

FIG. 8b — ENERGY DENSITY SPECTRUM OF FIG. 3 WAVEFORM

FIG. 8c — ENERGY DENSITY SPECTRUM OF FIG. 4 WAVEFORM

FIG. 12a — ENERGY DENSITY SPECTRUM OF FIG. 9 WAVEFORM.

FIG. 12b — ENERGY DENSITY SPECTRUM OF FIG. 10 WAVEFORM.

FIG. 12c — ENERGY DENSITY SPECTRUM OF FIG. 11 WAVEFORM.

FIG. 15a — ENERGY DENSITY SPECTRUM OF FIG. 2 WAVEFORM.

FIG. 15b — ENERGY DENSITY SPECTRUM OF FIG. 6 WAVEFORM.

FIG. 15c — ENERGY DENSITY SPECTRUM OF FIG. 7 WAVEFORM.

FIG. 16a — ENERGY DENSITY SPECTRUM OF FIG. 9 WAVEFORM

FIG. 16b — ENERGY DENSITY SPECTRUM OF FIG. 13 WAVEFORM

FIG. 16c — ENERGY DENSITY SPECTRUM OF FIG. 14 WAVEFORM

NON-LINEAR CORRECTION OF WAVEFORMS

All practical visual telecommunications systems, for example, must necessarily include limitations which have some adverse effect on picture quality. Thus, in an analogue transmission system bandwidth is limited to some finite value and in a digital system a limitation is imposed on bit rate. These limitations are necessary in the interests of economy and efficiency.

Transmission of an analogue television signal through a system of restricted bandwidth gives rise to two impairments known as "rise-time limitation" and "ringing." A system suffering from rise-time limitation will be unable to respond quickly to a step input and the effect visible in the received image will be one of blur. Ringing is a damped oscillatory response to a picture pulse and produces a series of closely-spaced alternate positive and negative images of decreasing intensity. The relative magnitudes of the two impairments depends mainly on the manner in which the response of the system decreases at the edges of the transmission band. For example, a gentle roll-off will produce a step response with little ringing but large rise-time, whereas a sharp cut-off will produce appreciable ringing but small rise-time.

Various systems both linear and non-linear have been proposed for modifying video signals to achieve a subjective improvement in picture quality. It has been found that a controlled amount of a single undershoot preceding and single oversheet following a step waveform enhances the appearance to the eye of the image transition which such a waveform represents. For example E. F. Brown in the November 1963 issue of the Journal of the SMPTE has described the use of an electromagnetic delay line to add an inverted second derivative (linear correction) to a waveform and the article states that the subjective definition of a television image may be improved by overemphasizing its luminance transitions. The risetimes, and therefore the slopes, of the waveforms representing such transitions can only be substantially affected by linear correction of this type at the expense of much overemphasizing ringing.

P. C. Goldmark and J. M. Hollywood in a paper entitled "A New Technique for Improving the Sharpness of Television Pictures" (Proceedings I.R.E. October, 1951) have described the use of non-linear circuitry to decrease the rise-time of an isolated, full-amplitude step input which is applied to a bandwidth-limited system. Goldmark and Hollywood reformed the approximately triangular derivative of the bandwidthlimited step signal into a "spike" and added the "spike" to the original waveform to obtain a full-amplitude step response with about half the original rise-time.

It is an object of the invention to provide an improved circuit for non-linear waveform correction.

The present invention provides a waveform correction circuit comprising:

an input terminal for receipt of a signal to be corrected, an output terminal from which, in use, a corrected signal is taken, a time-delay circuit having its input connected to the input terminal, a differentiator having its input connected to the input terminal, a circuit whose input/output characteristic is non-linear and skew-symmetrical having its input connected to the output of the differentiator, a further differentiator having its input connected to the output of the non-linear skew-symmetric circuit, a signal combining circuit operative to combine the output of the further differentiator and the output of the delay circuit, and means connecting the output of the signal combining circuit to the output terminal.

The waveform correction circuit can also include a further circuit whose input/output characteristic is nonlinear and skew-symmetrical having its input connected to the output of the further differentiator and its output connected to the input of the signal combining circuit. The said further non-linear skew-symmetric circuit can and usually will have a characteristic which is the inverse of the characteristic of the first-mentioned non-linear skew-symmetric circuit.

The first-mentioned non-linear skew-symmetric circuit can be a sign-preserving amplitude squaring circuit; that is a circuit whose output is the product of its input and the modulus of its input and the further non-linear skew-symmetric circuit can be a sign-preserving square-root circuit.

The signal correction circuit can be such as to decrease rise-time or conversely to decrease slope and/or ringing according to the senses of signals combined by the signal combining circuit, and the circuit configuration used.

The means connecting the output of the signal combining circuit to the output terminal can, when the circuit is to be used for decreasing slope, include a low-pass filter.

By way of example only, certain illustrative embodiments of the invention will now be described with reference to the accompanying drawings, in which.

The waveforms shown in FIGS. 2 and 9 also pertain to the circuit of FIG. 5.

The circuits are shown and described in block schematic form but their detailed realisation will be apparent to those skilled in the art.

Figure 1:
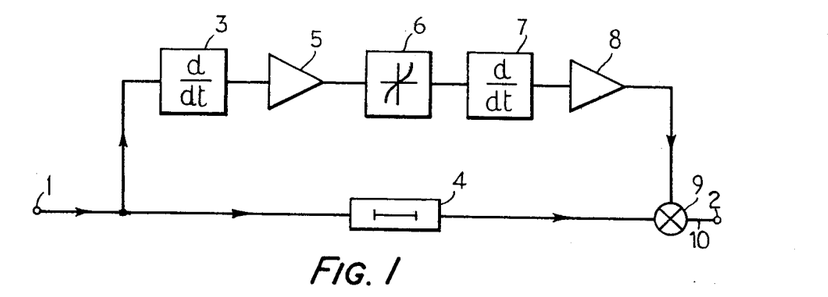
FIG. 1, shows a video signal correction circuit embodying the invention.

Referring to FIG. 1, a circuit is shown having an input terminal 1 for receipt of a signal to be corrected and an output terminal 2 from which the signal is taken after correction. The input terminal 1 is connected to both a differentiator 3 and a delay network 4. The differentiator can be realised by a lumped or a transversal network. The output of the differentiator 3 is connected to the input of an amplifier 5 and the output of the amplifier is connected to the input of a sign-preserving square-law circuit 6. It is possible to omit the amplifiers but their inclusion makes inversion and scaling simple. The square-law circuit 6 is such that its output signal comprises the square of the amplitude of its input signal, sign being preserved. The function of the square-law circuit 6 could alternatively be expressed by saying that its output signal comprises the product of its input signal and the modulus of its input signal. The use of non-linear devices such as diodes to generate square-law characteristics is well known to those skilled in the art and it is not therefore necessary to give a detailed circuit for the square-law circuit 6. The output of square-law circuit 6 is connected to the input of a further differentiator 7, the output of which is connected to the input of a further amplifier 8. The output of the amplifier 8 and the output of the delay network 4 (comprising the input signal delayed in time but otherwise unchanged) are combined in a combining circuit 9, the output of which is connected to terminal 2. The connection between the combining circuit 9 and the terminal 2 is referenced '10'.

Figure 2:
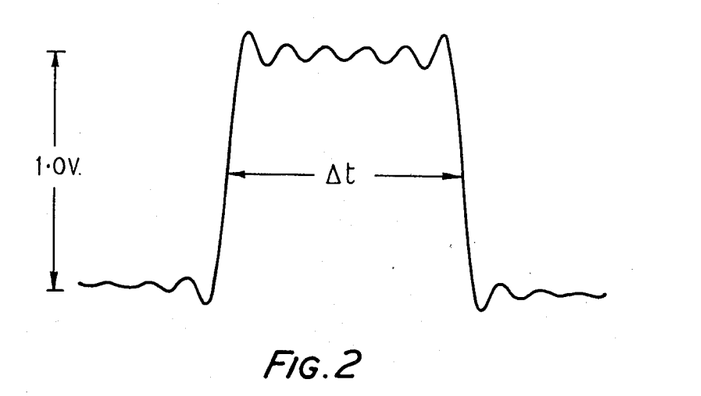
FIGS. 2, 3 and 4 shows waveforms pertaining to the circuit of FIG. 1.
Figure 3:
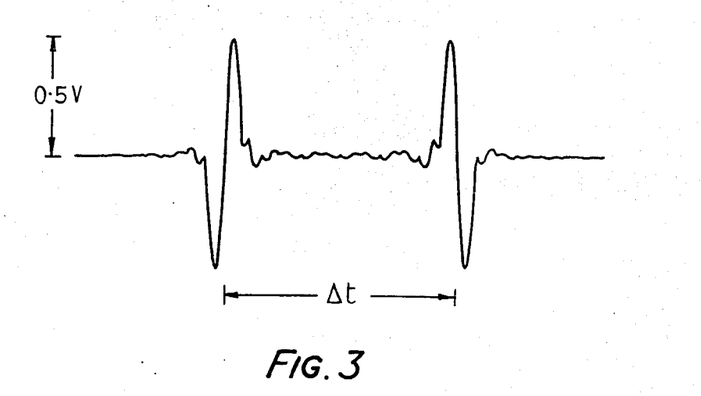

FIG. 2 shows a waveform corresponding to the output of an ideal low-pass filter when a certain square wave pulse is applied to its input. If such a waveform is applied to the terminal 1 of the circuit of FIG. 1 the resultant waveform appearing at the output of amplifier 8 will be as shown in FIG. 3. Thus, the combining circuit 9 combines the waveforms of FIGS. 2 and 3 to produce the resultant waveform shown in FIG. 4. It should be noted that the correct time relationship between the waveforms to be combined is achieved by the choice of time delay of the delay network 4.

Figure 4:
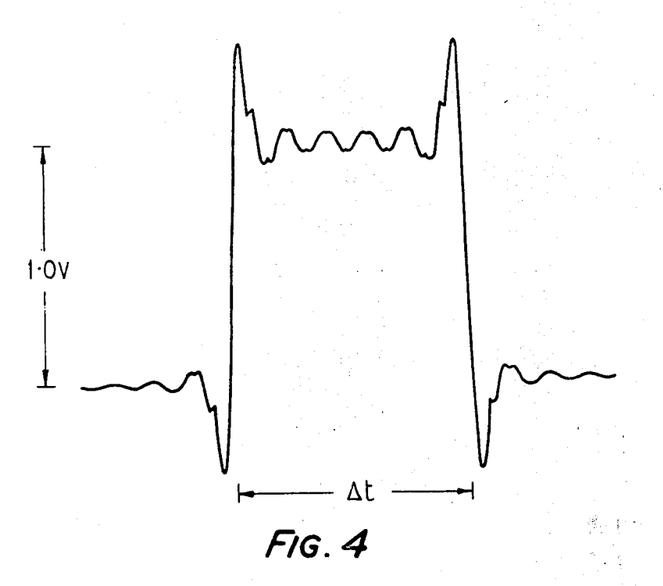

As shown the waveforms of FIGS. 2 and 3 have been added to produce the resultant FIG. 4 waveform having smaller rise-time and larger first undershoots and first overshoots in the vicinity of the transitions, but alternatively the FIG. 3 wave-form could be subtracted from the FIG. 2 waveform to produce a resultant waveform (not shown) having larger rise-time and smaller first undershoots and first overshoots in the vicinity of the transitions. It hardly need be explained that addition or subtraction of signals is determined by the choice of amplifier type (inverting or non-inverting) for amplifiers 5 and 8, by whether the signal combining circuit 9 adds or subtracts signals, and by sign changes in any other block of the circuit of FIG. 1. Similarly, it will be understood that scaling of signal magnitudes is an important factor in the proper combination of the delayed signal and the correction signal from amplifier 8 to achieve a particular correction. A more rigorous treatment of scaling will be given later.

An example of the use of the circuit of FIG. 1 with subtraction of the correction signal is to prevent slope overload in delta encoders. Contrariwise, the circuit can be used with addition of the correction signal to "crispen" the resultant picture in a television receiver.

Figure 5:
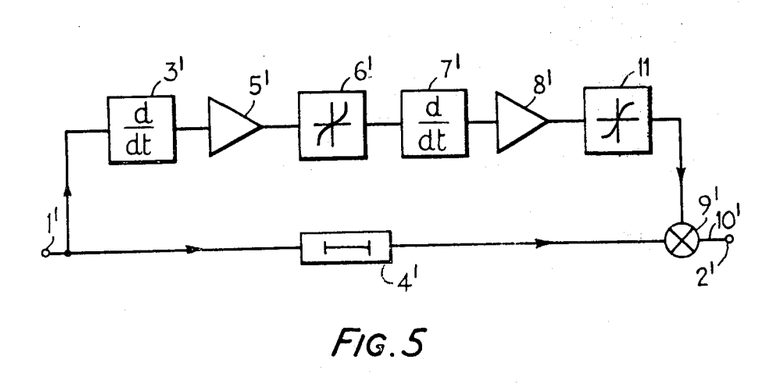
FIG. 5 shows another video signal correction circuit embodying the invention.

FIG. 5 shows a further circuit which is very similar to the circuit of FIG. 1 and corresponding parts have been given corresponding but primed reference numerals. It may easily be seen that the circuit of FIG. 5 consists of the circuit of FIG. 1 with an extra stage connected from the output of amplifier 8 to the correction signal input of the combining circuit 9. This extra stage is a sign preserving square-root circuit 11, that is to say its output comprises the square-root of the modulus of its input signal and has the sign of its input signal.

Figure 6:
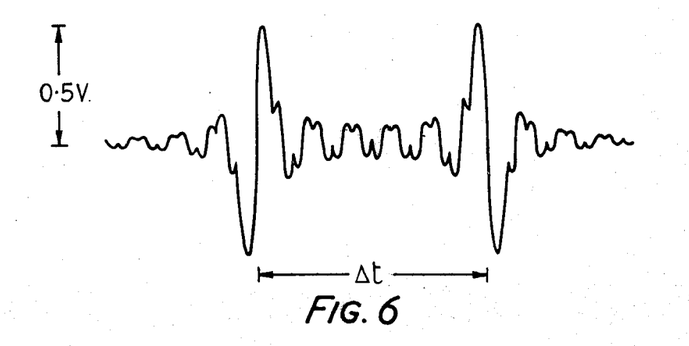
FIGS. 6 and 7 show waveforms pertaining to the circuit of FIG. 5.
Figure 7:
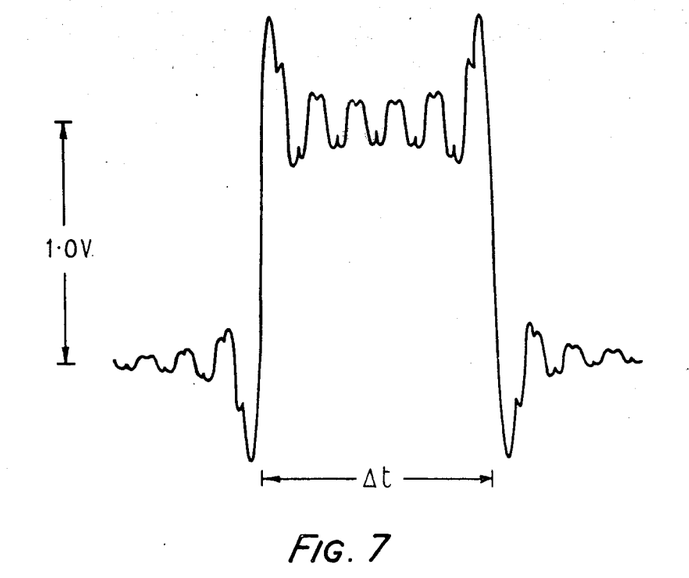

If the waveform of FIG. 2 is applied to input 1' of the circuit of FIG. 5 a correction signal as shown in FIG. 6 is produced at the output of the square-root circuit 11. The addition of the waveforms of FIGS. 2 and 6 by the combining circuit 9' produces a resultant waveform as shown in FIG. 7. It will be seen that the FIG. 7 waveform has a smaller rise-time than the FIG. 2 waveform. As in the case of FIG. 1 circuit, appropriate choice of the inverting and non-inverting properties of the component blocks of the circuit determines whether the correction signal is added or subtracted. The FIG. 5 circuit can thus function as either a rise-time decreaser (or picture crispener) or a rise-time increaser (or slope reducer).

The relative merits of the FIG. 1 and FIG. 5 circuits will be discussed later in relation to each other and in relation to known circuits using linear correction.

A generalised analysis of the operation of the described circuit as crispeners (rise-time decreasers) will now be given.

Let an input signal be expressed as $f(t)$, let this signal be firstly differentiated to yield a signal $f'(t)$ and then be amplified (or scaled) by a factor a, the resultant signal being $af'(t)$. Let $af'(t)$ represent the input to a non-linear device (such as 6 or 6') of skew-symmetrical characteristic representable by the power series:
where $x$ and $y$ are both functions of time and represent the input and output of the device respectively, $b_0, b_1 \ldots b_n$ are constants and the expression "sgn (x)" is equal to $-1$ or $+1$ for $x$ negative or $x$ positive respectively. Substituting $x = af$ yields $y =$ $(b_0 + b_2 a^2 f'^2 + b_4 a^4 f'^4 + \ldots)$ sgn $(F') + b_1 af' + b_3 a^3 f'^3 + b_5 a^5 f'^5 + \ldots$ Let this signal y be amplified (or scaled) by a factor c to yield a resultant signal $Y = c[(b_0 + b_2 a^2 f'^2 + b_4 a^4 f'^4 + \ldots)$ sgn $(f') + b_1 af' + b_3 a^3 f'^3 + b_5 a^5 f'^5 + \ldots]$ For the purpose of analysis the set of co-efficients $c b_n a^n$ can be replaced by a set $d_0, d_1, d_2 \ldots d_n$ and in particular it should be noted that if $d_n$ is zero for all n except n=k where $k$ is an integer (that is, if one term only of the series exists) then the influence of $a^k$ is not distinguishable from the influence of c. That is to say, the variation of Y in response to variation in $a^k$ is the same as the variation of Y in response to variation in c if only one term exists, but this is not true if two or more terms exist (because the power to which $a$ is raised varies from term to term whereas c is always to the power one).

Let the signal Y now be differentiated to yield $Y' = [2d_2 f'f'' + 4d_4 f'^3 f'' + \ldots]$ sgn $(f') + d_1 f'' + 3d_3 f'^2 f'' + \ldots$
$= d_1 f'' + 2d_2 |f'| f'' + 3d_3 f'^2 f'' + 4d_4 |f'|^3 f'' + \ldots$ $= f'' \sum_{n=1}^{N} nd_n |f'|^{n-1}$ Let Y' now be subtracted from $f(t)$ to yield $F(t) = f(t) - f''(t) \sum_{n=1}^{N} nd_n |f'|^{n-1}$ -continued $$= f(t) - cf''(t) \sum_{n=1}^{N} n a_n b_n |f'|^{n-1}$$

In the exemplary circuit of FIG. 1 a sign-preserving square-law (other laws are possible) non-linearity is inserted between two stages of differentiation; this effectively means that $d_n = 0$ for all n except $n = 2$. Let the input signal $f(t)$ be expressed as $f(t)=kg(t)$ where $k$ represents the waveform amplitude and $g(t)$ its shape, then $F(t) = kg(t) - 2b_2a^2ck^2g''(t)g'(t) = kg(t) - pk^2g''(t)g'(t)$ where $p = 2b_2a^2c$
and describes the scaling inside the system and can be freely chosen. For example, $p$ can be set equal to unity. The correcting signal for the circuit of FIG. 1 is proportional to the square of the amplitude $k$ of the input signal.

The performance of the FIG. 1 circuit can be assessed by considering a particular signal $g(t)$, and inspecting the various waveforms in both the time and frequency domains. The voltage waveform resulting from the scanning of a white band on a black background can reasonbly be represented by a rectangular pulse of width $\Delta t$. Passing this rectangular pulse through a low-pass filter closely approximating to an ideal low-pass filter of cut-off frequency $$f_c = \frac{6}{\Delta t}$$

gives the waveform $kg(t)$ to be applied to the input 1. (In practice, $f_c$ could have any value and is taken as $$\frac{6}{\Delta t}$$

by way of example only).

Figure 8A:
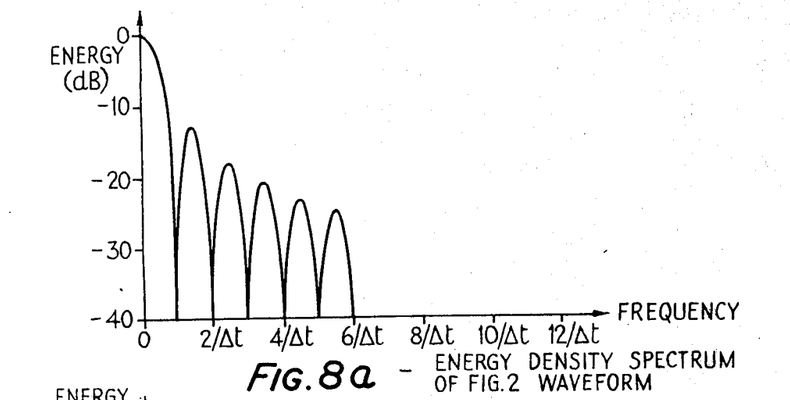
FIGS. 8a, 8b, and 8c show energy density spectra of the FIGS. 2, 3 and 4 waveforms respectively.
Figure 8B:
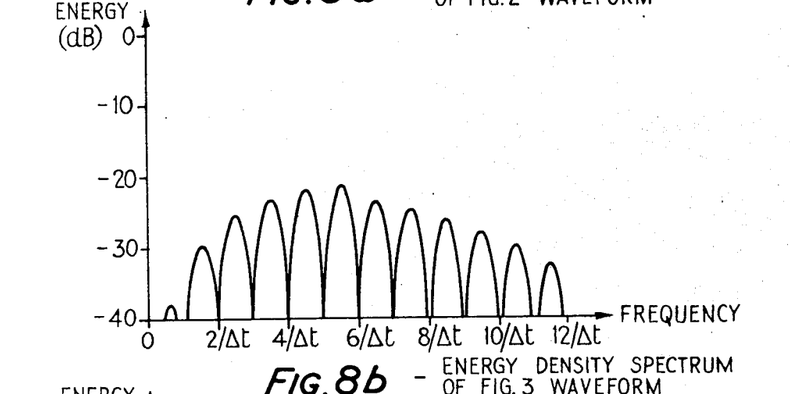
Figure 8C:
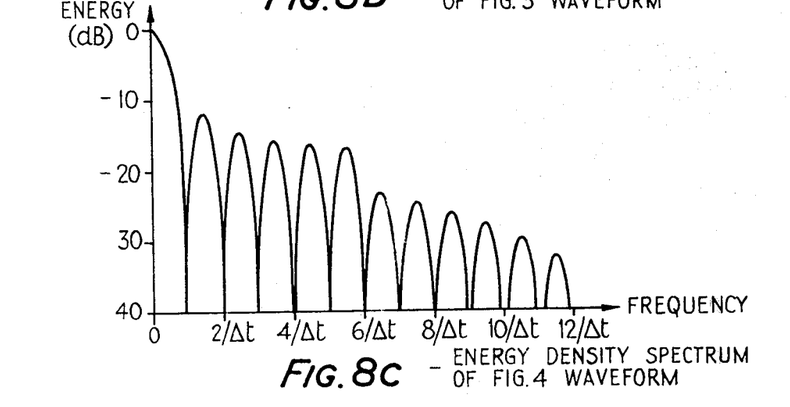

A full-amplitude (unity scaled) waveform $f(t)$ and the corresponding correcting and corrected waveforms are shown in FIGS. 2, 3 and 4 respectively. Corresponding energy density spectra, with components all relative to the zero-frequency component of the full-amplitude $f(t)$ are shown in FIGS. 8a, 8b, and 8c. It can be seen from FIG. 4 that the long-term ringing amplitude is affected but little by the non-linear correction whereas this would not be true of linear correction. The high-frequency energy generated by the non-linear operation is clearly seen in FIG. 8c and thus it is feasible to reduce rise-time by a considerably greater amount that would be practically possible using a linear correction signal (which would not generate any "out of band" high-frequency energy). The non-linear derivation of the correcting signal selectively attenuates noise on large areas of pictures (where the first derivative is near zero) so that any noise existing in the original waveform is not generally made worse except at transistions.

Figure 9:
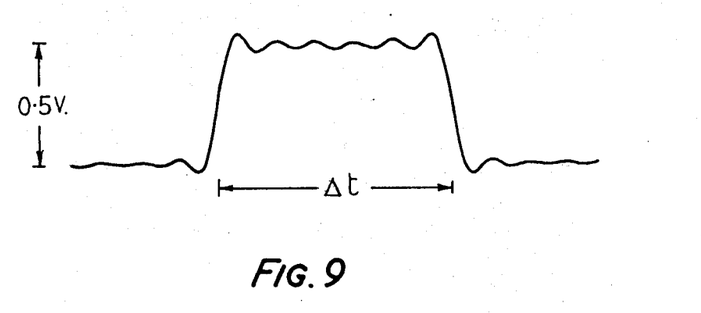
FIGS. 9, 10 and 11 show more waveforms pertaining to the circuit of FIG. 1, FIGS. 12a, 12b, and 12c show energy density spectra of the FIGS. 9, 10 and 11 waveforms respectively.
Figure 10:
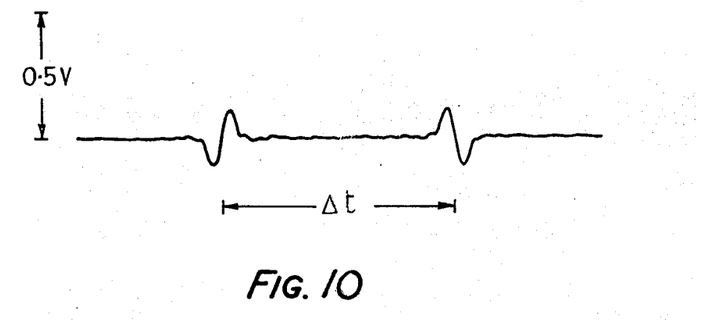
Figure 11:
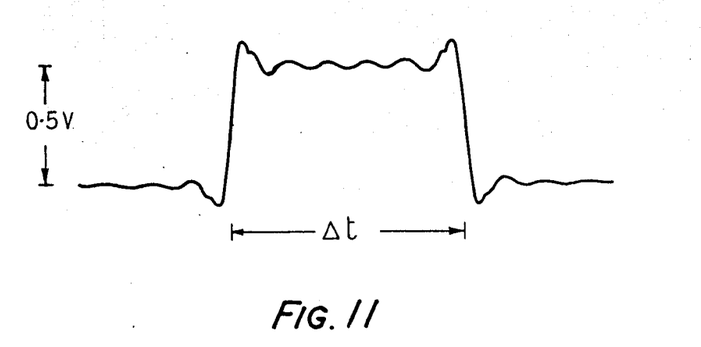
Figure 12A:
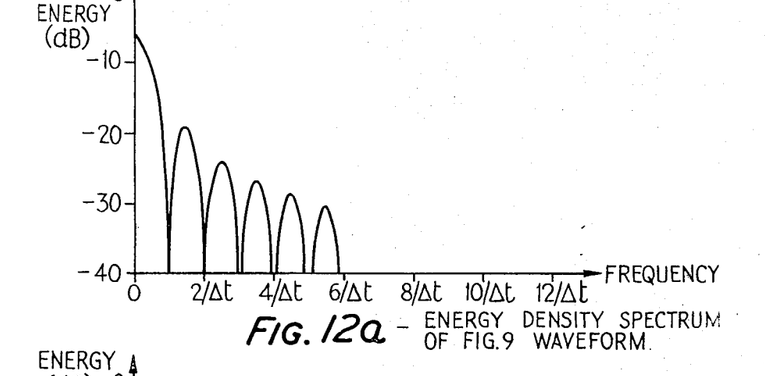
Figure 12B:
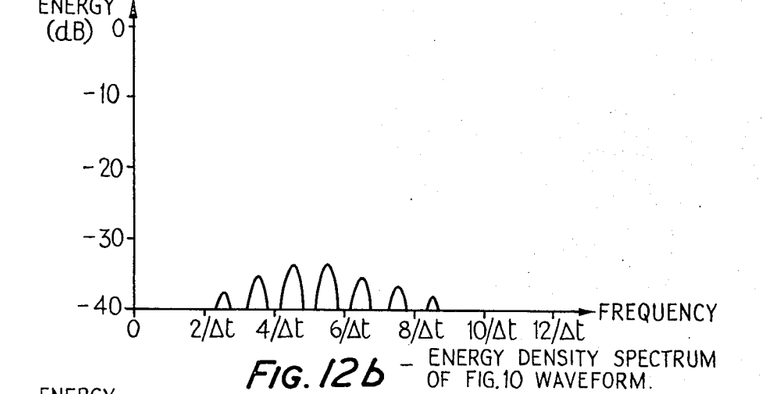
Figure 12C:
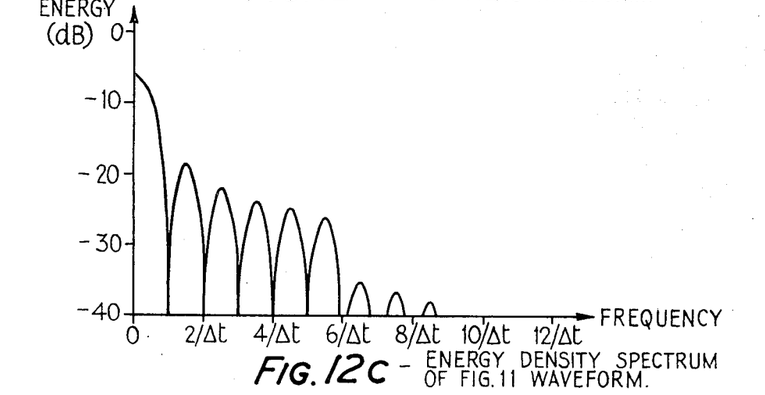
Figure 13:
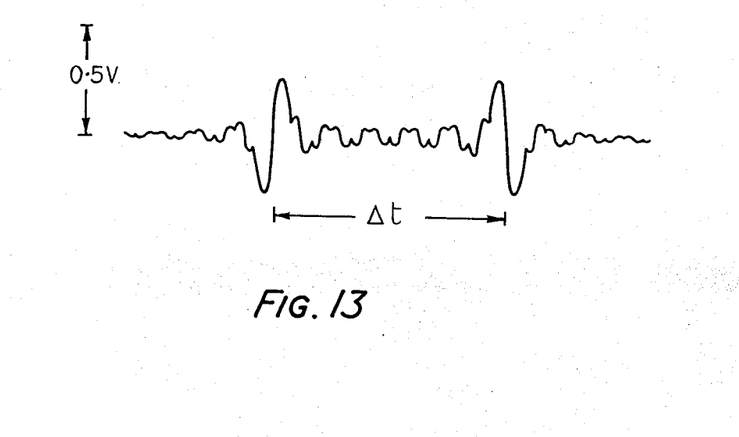
FIGS. 13 and 14 show more waveforms pertaining to the circuit of FIG. 5, FIGS. 15a, 15b and 15c show energy density spectra of the FIGS. 2, 6 and 7 waveforms respectively.
Figure 14:
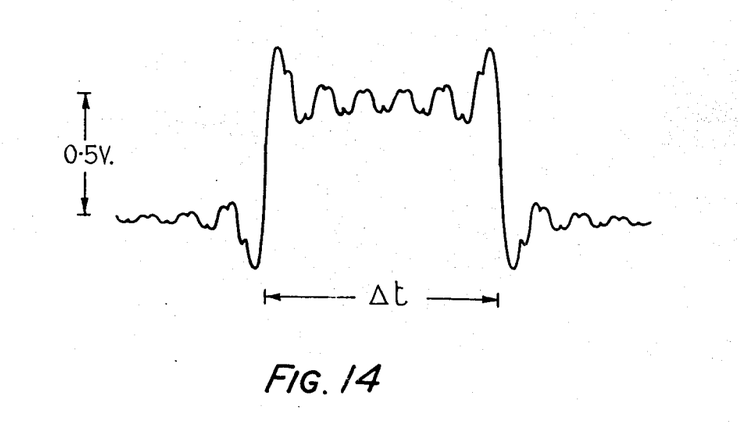

For the circuit of FIG. 1 the amplitude of the correcting signal is, as stated by way of an example, proportional to the square of the input signal amplitude. FIGS. 2, 3 and 4 should be compared with their counterparts FIGS. 9, 10 and 11 respectively and similarly FIGS. 8a, 8b, and 8c should be compared with FIGS. 12a, 12b and 12c. In FIG. 9, the input signal is shown halved in amplitude and as shown in FIG. 10 the resultant correcting signal is reduced to one quarter of the amplitude of the FIG. 3 correcting signal. The corrected signal is shown in FIG. 11. Comparison of FIGS. 4 and 11 shows that "crispening" achieved by the circuit is effective mainly on large amplitude transitions. This is to some extent a disadvantage of the FIG. 1 circuit since in most television or visual telephone pictures large amplitude transitions are not particularly common. This disadvantage would not, however, matter in the transmission of documents having only black (for example, characters) and white (for example, paper) levels.

Figure 15A:
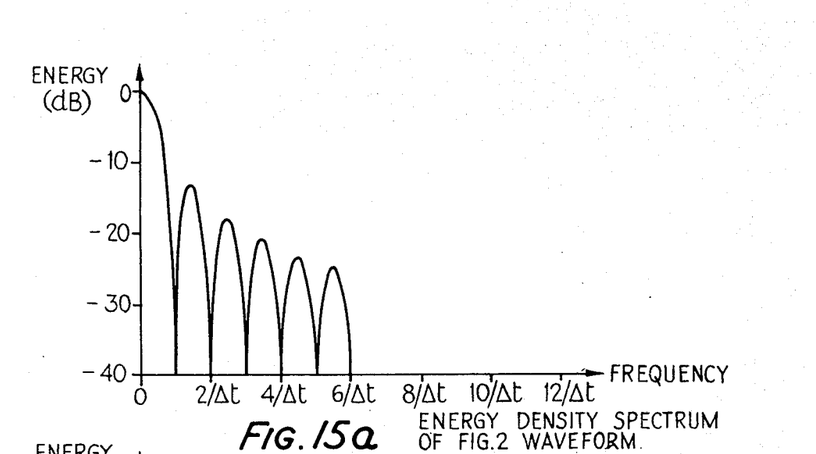
Figure 15B:
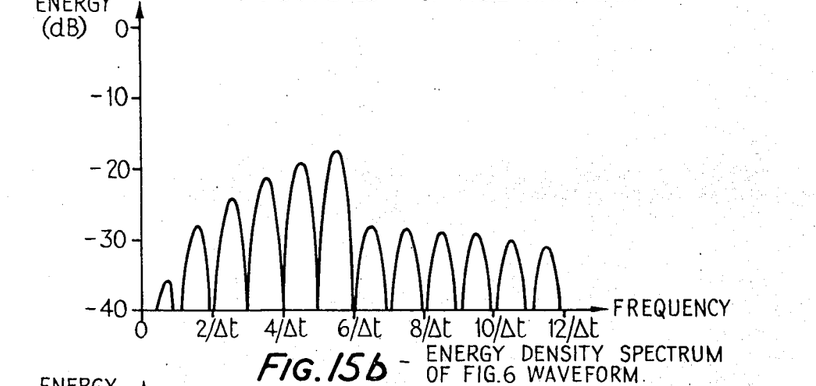
Figure 15C:
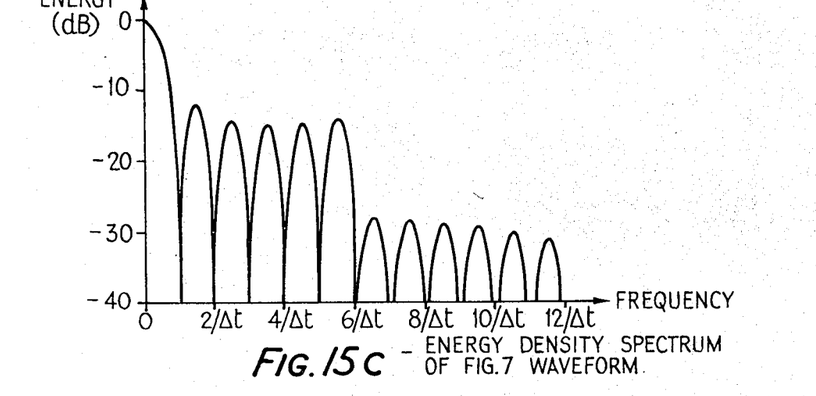
Figure 16A:
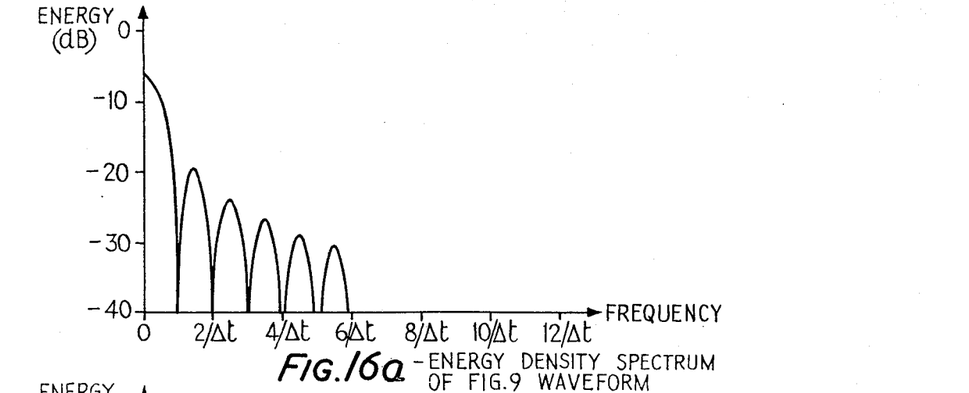
FIGS. 16a 16b and 16c show energy density spectra of the FIGS. 9, 13 and 14 waveforms respectively.
Figure 16B:
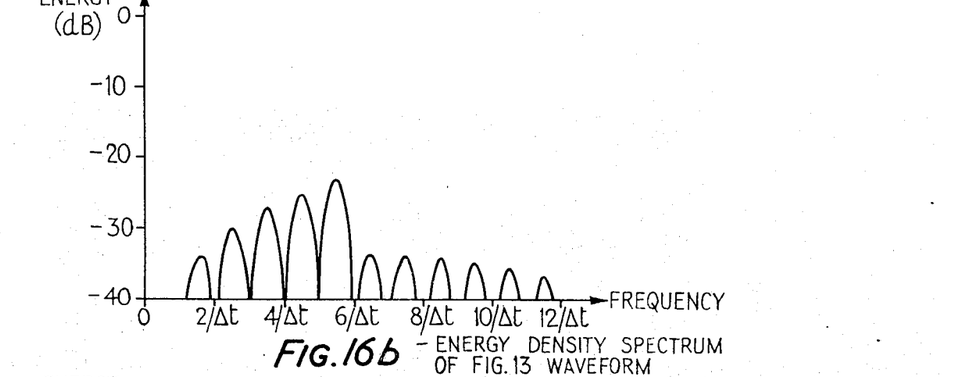
Figure 16C:
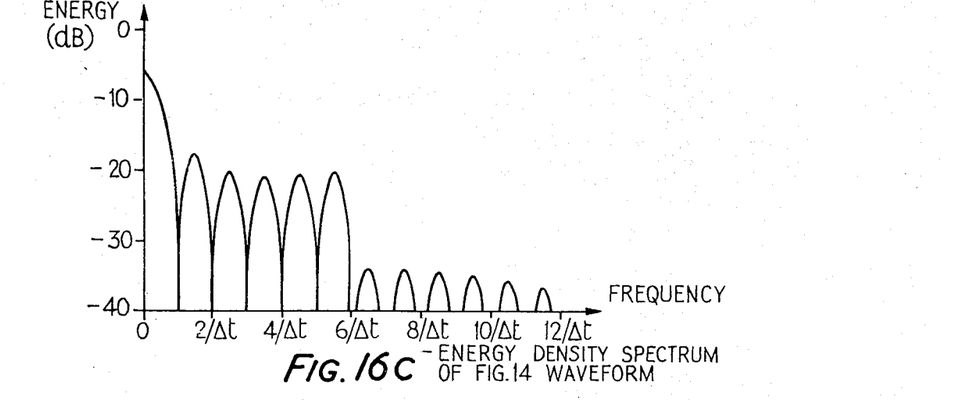

The circuit of FIG. 5 is capable of crispening both high and low amplitude signals while retaining the main advantage (large reduction of rise-time) of the FIG. 1 circuit. The circuit of FIG. 5 is slightly inferior to the circuit of FIG. 1 in handling signals with large amounts of noise and ringing, but is superior to linear correcting circuits. The insertion of the inverse non-linear circuit 11 after the second stage of differentiation gives the FIG. 5 circuit its advantage over the circuit of FIG. 1. For the circuit of FIG. 5:

$$f(t) = kg(t) - rk \ g' \ g'' \ \tfrac{1}{2} \ \text{sgn} \ (g'')$$

where $r = 2b_2a^2c \ \tfrac{1}{2}$ and again describes the scaling inside the system which can be freely chosen and can for instance be set equal to unity. The correcting signal is proportional to the input signal amplitude and the circuit of FIG. 5 thus combines the desirable characteristics of both linear and non-linear correction. The shapes of full-amplitude and half-amplitude signals as functions of time are given in FIGS. 2, 6 and 7 and their counterparts FIGS. 9, 13 and 14 respectively. Full-amplitude energy density spectra are shown in FIGS. 15a, 15b and 15c (FIG. 15a is FIG. 8a repeated for ease of comparison) and half-amplitude energy density spectra are shown in FIGS. 16a, 16b and 16c (FIG. 16a is FIG. 12a repeated for ease of comparison). In the graphs of spectra, all components are shown on a logarithmic (dB) scale relative to the zero-frequency component of a full-amplitude $f(t)$ waveform.

Comparison of the full-and half-amplitude Figures shows the one-to-one correspondence between the amplitude of the signal to be corrected and the correcting signal. The circuit of FIG. 5 is able to achieve a larger decrease in rise-time than a linear correction circuit could for equal ringing in the corrected signal and indeed it is possible to achieve a two-fold improvement in this respect. Examination of the energy density spectra graphs for the circuit of FIG. 5 shows that "out-of-band" energy is present.

If electrical noise is present in the signal to be corrected, the circuits described modify the amplitude and the power density spectrum of the noise in the correcting signal in different ways. In a television display, it is a well-known fact that the visibility of noise decreases as the noise frequency increases, so that with a moderate amount of noise present, neither of the described circuits noticeably increases the amount of visible noise in the display. When a very large amount of noise is present, the FIG. 1 circuit is superior to the FIG. 5 circuit; which is in turn superior to linear correction circuits. The above theoretical discussion and circuit comparison has been limited to the decrease of rise-time, the converse operation of the circuits will now be discussed.

There are applications in which it is necessary to limit the slope of waveforms and reduce ringing which will be produced by bandwidth restriction. Limitations on the slope of waveforms originating from wideband sources, such as television cameras, may be necessitated by the subsequent processing, for example analogue-to-digital conversion by delta encoders, or recording using slits of styli of finite dimensions. Limitations on ringing are, for example, desirable in order to keep the impairment of certain types of television pictures low. Known linear correction circuits are capable of reducing ringing but such circuits also unnecessarily reduce the slope of small-amplitude transitions and are not really satisfactory in this application.

It is important to note that slope is proportional both to rise-time and to signal amplitude, the rise-time being independent of signal amplitude. The amplitude of ringing occasioned by bandwidth limitation depends both on the bandwidth restriction and on the slope of the transition in the signal. The use of the non-linear correction circuit of FIG. 1 enables either slope or ringing (after further low-pass filtering) or both to be controlled yet without reducing the sharpness of small-amplitude transitions.

Figure 17A:
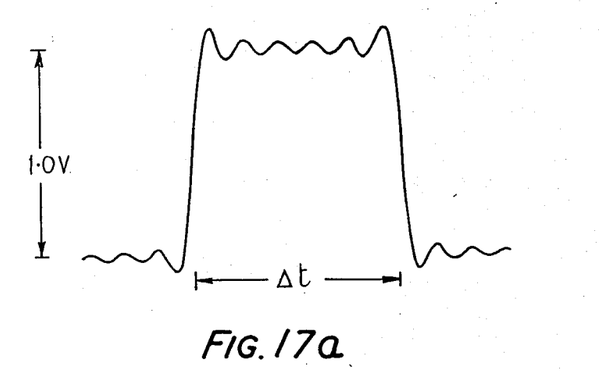
FIGS. 17a, 17b and 17c, 18a 18b and 18c are further waveforms pertaining to the operation of the circuit of FIG. 1, when additionally including a low-pass filter at the output terminal.
Figure 17B:
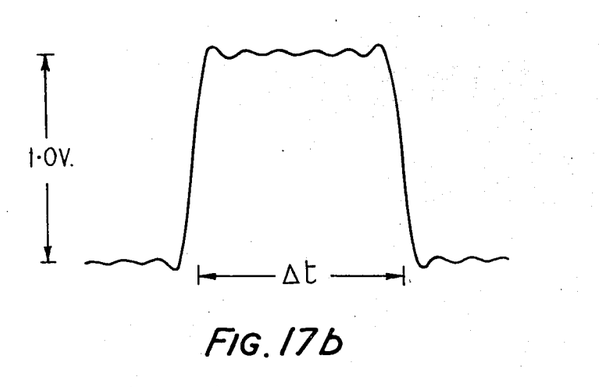
Figure 17C:
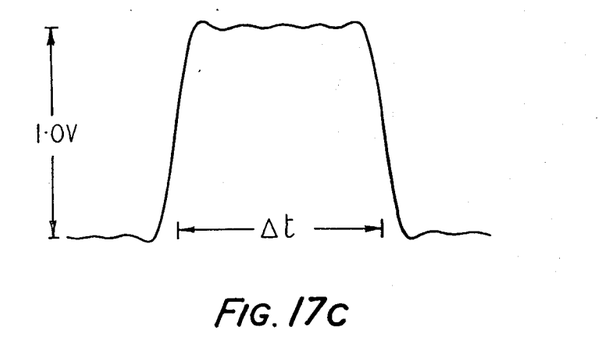
Figure 18A:
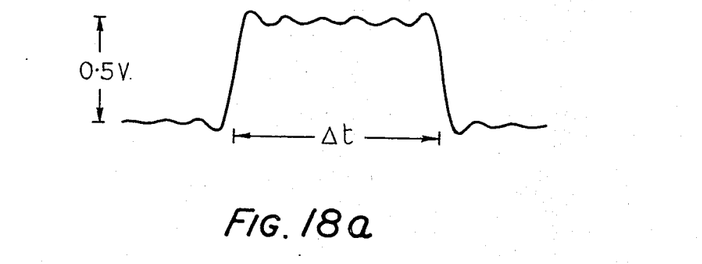
Figure 18B:
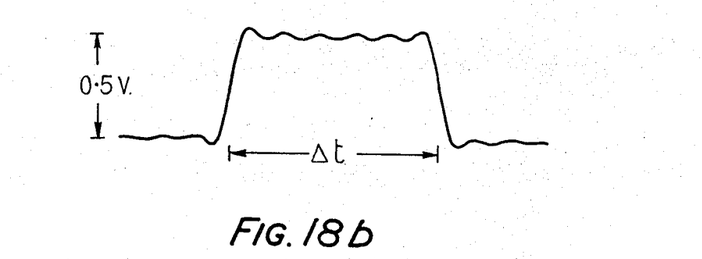
Figure 18C:
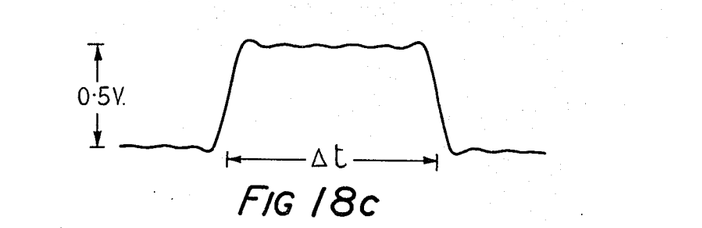

Consider a pulse corresponding to the output of a low-pass filter closely approximately to an ideal low-pass filter of cut-off frequency $$\frac{12}{\Delta t}$$

in response to an input rectangular pulse of width $\Delta t$. If this output pulse is then passed through a low-pass filter closely approximating to an ideal low-pass filter of cut-off frequency $$\frac{6}{\Delta t}$$

the waveform shown in FIG. 17a is produced for a full-amplitude input and that in FIG. 18a for a half-amplitude input. FIGS. 17a and 18a shown waveforms having large ring amplitudes proportional to signal amplitude. FIG. 17b shows the resultant waveform if the output of the $$\frac{12}{\Delta t}$$

filter is passed through the circuit of FIG. 1 used in its subtraction of correction signal mode of operation and then applied to the $$\frac{6}{\Delta t}$$

filter. FIG. 17c shows the resultant waveform if the scaling p (see earlier) of the circuit is twice that for FIG. 17b. FIGS. 18b and 18c correspond to FIGS. 17b and 17c respectively but relate to the half-amplitude input of FIG. 18a.

Figure 19A:
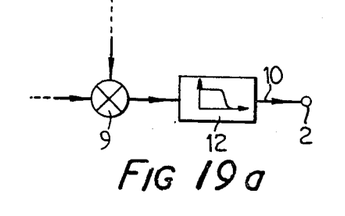
FIGS. 19a and 19b illustrate the connection of a low-pass filter in the circuits of FIGS. 1 and 5.
Figure 19B:
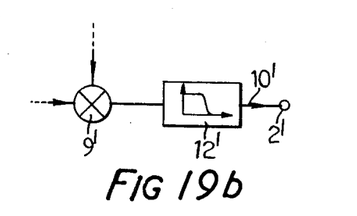

FIG. 19a illustrates a low-pass filter 12 connected between the signal combining circuit 9 and terminal 2 of the circuit of FIG. 1. FIG. 19b is similar but shows a low-pass filter 12' connected between circuit 9' and terminal 2' of FIG. 5.

Comparison of FIG. 17b with 18b and FIG. 17c with FIG. 18c shows that ringing amplitude has been reduced and the amplitude of the reduced ringing is substantially constant rather than proportional to the signal amplitude (as it would be in the case of a linear correction circuit). Ring amplitude can be maintained constant over a wide range of signal amplitudes thus retaining sharp transitions at low signal amplitudes.

For illustrative purposes, waveforms obtained by passing a rectangular pulse through an ideal low-pass filter and an arbitrary scaling of the correction signal path have been considered. In practice, signals originating from various sources and having passed through transmission media have to be processed, but such signals (particularly when the transmission systems are well-designed) closely resemble the waveforms discussed here. Thus, while the description given here may seem somewhat theoretical those skilled in the art will have no difficulty in reducing it to practice.

It should be understood that although the use of correcting signals obtained using non-linearities following square and square-root laws is described, other power law non-linearities can be employed. Both power law and scaling can be chosen to suit the particular application, for example the characteristic of a signal source or of a transmission system.

In some cases, optimum waveforms correction may be achieved by the connection of a number of correction circuits, of which FIG. 1 and FIG. 5 are examples, in cascade.

We claim:
1. A waveform correction circuit comprising:
    an input terminal for receipt of a signal to be corrected, an output terminal from which, in use, a corrected signal is taken,
    a time-delay circuit having its input connected to the input terminal,
    a differentiator having its input connected to the input terminal,
    a circuit whose input/output characteristic is non-linear and skew-symmetrical having its input connected to the output of the differentiator,
    a further differentiator having its input connected to the output of the non-linear skew-symmetric circuit,
    a signal combining circuit operative to combine the output of the further differentiator and the output of the delay circuit, and
    means connecting the output of the signal combining circuit to the output terminal.
2. A waveform correction circuit as claimed in claim 1 including a further circuit whose input/output characteristic is non-linear and skew-symmetrical having its input connected to the output of the further differentiator and its output connected to the input of the signal combining circuit.
3. A waveform correction circuit as claimed in claim 2, wherein the said further non-linear skew-symmetric circuit has a characteristic which is the inverse of the characteristic of the first-mentioned non-linear skew-symmetric circuit.
4. A waveform correction circuit as claimed in claim 3, wherein the first-mentioned non-linear skew-symmetric circuit is a sign-preserving amplitude squaring circuit and the further non-linear skew-symmetric circuit is a sign-preserving square-root circuit.
5. A waveform correction circuit as claimed in claim 1, wherein the circuit is operative to decrease rise-time.
6. A waveform correction circuit as claimed in claim 1, wherein the circuit is operative to decrease slope.
7. A waveform correction circuit as claimed in claim 6, wherein the means connecting the output of the signal combining circuit to the output terminal includes a low-pass filter.
8. A waveform correction circuit as claimed in claim 1, wherein the circuit is operative to decrease ringing.

9. A waveform correction circuit as claimed in claim 1, wherein the circuit is operative to decrease slope and ringing.

10. A waveform correction circuit comprising:
an input terminal for receipt of a signal to be corrected,
an output terminal from which, in use, a corrected signal is taken,
a time-delay circuit having its input connected to the input terminal,
a differentiator having its input connected to the input terminal,
first amplifier means having its input connected to the output of the differentiator,
a circuit whose input/output characteristic is non-linear and skew-symmetrical having its input connected to the output of the first amplifier means,
a further differentiator having its input connected to the output of the non-linear skew-symmetric circuit,
second amplifier means having its input connected to the output of the further differentiator,
a signal combining circuit operative to combine the output of the second amplifier means and the output of the delay circuit, and
means connecting the output of the signal combining circuit to the output terminal.

11. A waveform correction circuit as claimed in claim 10 including a further circuit whose input/output characteristic is non-linear and skew-symmetrical having its input connected to the output of the second amplifying means and its output connected to the input of the signal combining circuit.

12. A waveform correction circuit as claimed in claim 11, wherein the said further non-linear skew-symmetric circuit has a characteristic which is the inverse of the characteristic of the first-mentioned non-linear skew-symmetric circuit.

13. A waveform correction circuit as claimed in claim 12, wherein the first-mentioned non-linear skew-symmetric circuit is a sign-preserving amplitude squaring circuit and the further non-linear skew-symmetric circuit is a signpreserving square-root circuit.

14. A waveform correction circuit as claimed in claim 13, wherein the means connecting the output of the signal combining circuit to the output terminal includes a low-pass filter.

* * * * *